US010218237B2

(12) United States Patent
Menauer et al.

(10) Patent No.: US 10,218,237 B2
(45) Date of Patent: Feb. 26, 2019

(54) METHOD FOR PRODUCING A STATOR FOR AN ELECTRIC MOTOR

(71) Applicant: Bayerische Motoren Werke Aktiengesellschaft, Munich (DE)

(72) Inventors: Thomas Menauer, Iandshut (DE); Sherif Zaidan, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 697 days.

(21) Appl. No.: 14/710,914

(22) Filed: May 13, 2015

(65) Prior Publication Data
US 2015/0244232 A1   Aug. 27, 2015

Related U.S. Application Data

(63) Continuation of application No. PCT/EP2013/072054, filed on Oct. 22, 2013.

(30) Foreign Application Priority Data

Nov. 15, 2012 (DE) ........................ 10 2012 220 855

(51) Int. Cl.
*H02K 3/38* (2006.01)
*H02K 3/52* (2006.01)
*H02K 15/02* (2006.01)

(52) U.S. Cl.
CPC .............. *H02K 3/38* (2013.01); *H02K 3/522* (2013.01); *H02K 15/026* (2013.01); *Y10T 29/49009* (2015.01)

(58) Field of Classification Search
CPC ........ H02K 15/026; H02K 3/38; H02K 3/522; Y10T 29/49009
See application file for complete search history.

(56) References Cited

U.S. PATENT DOCUMENTS

| 3,861,026 A  * | 1/1975 | Swaim .................. H02K 3/325 |
| | | 242/432.6 |
| 5,659,219 A | 8/1997 | Momose et al. |
| 7,348,706 B2 * | 3/2008 | Ionel ..................... H02K 1/148 |
| | | 310/216.009 |

(Continued)

FOREIGN PATENT DOCUMENTS

| CN | 202364080 U | 8/2012 |
| CN | 102668341 A | 9/2012 |

(Continued)

OTHER PUBLICATIONS

Chinese Office Action issued in Chinese counterpart application No. 201380053319.4 dated Jul. 29, 2016, with English translation (Fifteen (15) pages).

(Continued)

*Primary Examiner* — Minh Trinh
(74) *Attorney, Agent, or Firm* — Crowell & Moring LLP

(57) ABSTRACT

The invention relates to a process for producing a stator for an electric machine, comprising the following steps in the given sequence: Providing a cylindrical stator body having several stator slots, inserting at least one first coil in the stator slots, the first coil having a first coil end on at least one face of the stator body, and inserting the first coil end in at least one molded body for electrically insulating the first coil end.

10 Claims, 3 Drawing Sheets

(56) References Cited

U.S. PATENT DOCUMENTS

| | | | |
|---|---|---|---|
| 8,643,243 B2 | 2/2014 | Bliemeister et al. | |
| 2007/0170792 A1* | 7/2007 | Bott | H02K 3/522 310/71 |
| 2010/0148615 A1* | 6/2010 | Sasaki | H02K 3/522 310/180 |
| 2012/0274156 A1 | 11/2012 | Chamberlin et al. | |
| 2012/0274256 A1 | 11/2012 | O'Rourke | |
| 2015/0244232 A1* | 8/2015 | Menauer | H02K 3/38 310/43 |

FOREIGN PATENT DOCUMENTS

| | | |
|---|---|---|
| DE | 101 05 983 A1 | 9/2002 |
| DE | 10 2005 002 364 A1 | 7/2006 |
| GB | 2 023 460 A | 1/1980 |
| GB | 2 288 920 A | 11/1995 |

OTHER PUBLICATIONS

Chinese Office Action issued in Chinese counterpart application No. 201380053319.4 dated Feb. 22, 2017, with partial English translation (Fourteen (14) pages).
International Search Report dated Jul. 17, 2014 (Two (2) pages).
German Search Report dated Oct. 4, 2013 with Statement of Relevancy (Six (6) pages).

\* cited by examiner

METHOD FOR PRODUCING A STATOR FOR AN ELECTRIC MOTOR

CROSS REFERENCE TO RELATED APPLICATIONS

This application is a continuation of PCT International Application No. PCT/EP2013/072054, filed Oct. 22, 2013, which claims priority under 35 U.S.C. § 119 from German Patent Application No. 10 2012 220 855.0, filed Nov. 15, 2012, the entire disclosures of which are herein expressly incorporated by reference.

FIELD OF THE INVENTION

The present invention relates to a stator for an electric machine as well as to a process for producing the stator. The stator is used particularly for an electric machine in a motor vehicle. The electric machine is preferably used for driving the motor vehicle.

BACKGROUND OF THE INVENTION

The stator and the rotor are central components of an electric machine. Coils are placed in the stator for generating a rotating electromagnetic field, which drives the rotor. For a perfect functioning, the coils in the stator have to be electrically insulated with respect to one another. In the prior art, insulating papers, such as NOMEX paper flags, are used for this purpose. The insulation papers have to be manually placed between the coils. In addition to requiring physical effort, this process is very time-consuming, particularly at the coil ends. In addition, as a result of the possible slipping of the insulation papers, considerable quality problems will occur during subsequent working steps, which require constant control and do not permit a fully automatic production process.

SUMMARY OF THE INVENTION

It is an object of the present invention to indicate a process for producing a stator for an electric machine which, while the implementation is simple and process-reliable, permits an operationally secure insulation of the coil ends. Furthermore, it is an object of the present invention to specify a stator for an electric machine which, while the production and assembly are cost-effective, provides an operationally secure insulation of the coil ends.

This object is achieved by means of the characteristics of the independent claims. The respective objects of the subclaims are advantageous further developments of the invention.

The object is therefore achieved by a process for producing a stator for an electric machine. The electric machine is particularly used in motor vehicles. The process comprises the following steps in the specified sequence: (i) Providing a cylindrical stator body having several stator slots; (ii) placing at least one first coil in the stator slots, the first coil having a first coil end on at least one face of the stator body; (iii) placing the first coil end in at least one molded body for electrically insulating the first coil end. The used molded body separates the coil ends from one another. According to the invention, a molded body is used instead of an insulation paper. This molded body itself has a certain stability, so that its mounting is simplified. In the course of the process according to the invention, at least one coil is first inserted into the stator body. Only then will the mounting of the molded body and the inserting of the coil end into the molded body take place. In contrast to conventional insulation paper, the molded body cannot slip during subsequent working steps and therefore permits a secure insulation of the individual coil ends.

It is preferably provided that several first coils are placed in the stator slots. These several first coils have several first coil ends. Subsequently, the mounting of the molded body and therefore the insertion of the first coil ends into the molded body takes place.

After the insertion of the first coil ends into the molded body, second coils are preferably inserted into the stator slots. After the insertion of the second coils, the second coil ends of the second coils are also inserted into the molded body.

It is preferably provided that at least one first coil end and one second coil end are inserted at a molded body.

It is particularly provided that the second coils in the cylindrical stator body are arranged within the first coils. Particularly preferably, the second coils are arranged to be offset with respect to the first coils along the circumference of the stator body.

It is preferably provided that a single one-piece molded body is used for each face of the stator body. This molded body is therefore further developed in a ring-shaped manner. As an alternative, it is conceivable to use several individual molded bodies. These individual molded bodies will then each form a segment of the ring.

The first and/or second coils are preferably wound outside the stator body and are pulled into the stator slots after the winding. As an alternative, it is conceivable to wind the coils directly into the stator slots.

After the insertion of all coil ends into the molded body, the coil ends can be pressed together with the molded body. This preferably takes place for compressing the windings and/or for positioning the coil ends. By using the relatively stable molded body, it is avoided that the molded body slips. A good insulation of the coil ends is therefore always ensured.

The molded body preferably consists of injection-molded plastic.

When using a one-piece and therefore ring-shaped molded body, preferably two variants are provided for the mounting. In the first variant, the molded body is deformed so that the diameter of the molded body will be reduced. In the second variant, the molded body will partially be folded toward the inside. In both variants, the molded body will be placed on the first coil ends from the inside. In both variants, the molded body is preferably designed as a closed ring.

The invention further comprises a stator for an electric machine. The stator comprises a cylindrical stator body with several stator slots. At least one first coil is inserted into the stator slots. The first coil has a first coil end on at least one face of the stator body. Furthermore, at least one second coil is inserted into the stator slots. The second coil has at least one second coil end on the same face of the stator body. The second coil is situated within the first coil in the stator body. The individual coil ends are electrically insulated with respect to one another by a molded body. For this purpose, the molded body has a separating wall. This separating wall is situated between the at least one first coil end and the at least one second coil end.

In addition, the invention comprises a molded body for the electric insulation of coil ends arranged in a stator of an electric machine, wherein the stator comprises a cylindrical stator body with several stator slots, at least one first coil inserted into the stator slots, which first coil has a first coil end on at least one face of the stator body, and at least one second coil inserted into the stator slots, which second coil has a second coil end on the at least one face of the stator body, wherein the second coil is arranged in the cylindrical stator body within the first coil. The molded body according to the invention comprises a separating wall which, in the installed condition of the molded body, is arranged between the first coil end and the second coil end.

The advantageous embodiments described within the scope of the process according to the invention and the subclaims are correspondingly advantageously applied to the stator according to the invention and to the molded body according to the invention.

It is particularly provided that the separating wall completely covers the coil ends. For this purpose, the separating wall is further developed to be larger than the coil ends, so that a secure insulation is ensured between the coil ends, particularly the first coil ends and the second coil ends.

The separating wall of the at least one molded body is preferably arranged between several first coil ends and several second coil ends. A one-piece molded body is particularly used for each face of the stator. This molded body has a continuous ring-shaped separating wall. This one separating wall separates all first coil ends from all second coil ends on the respective face of the stator.

The molded body preferably has partition walls. In particular, the partition walls stand perpendicularly with respect to the separating wall. The partition walls are particularly arranged such that the each separate two adjacent first coil ends or two adjacent second coil ends from one another.

The used molded body has the special advantage of rapid mounting. Instead of, as previously, laboriously inserting insulation paper by hand after the pulling-in of all coils between these coils, the molded body is inserted by a device or manually after the pulling-in of the first coils. This additionally increases the quality because the molded body permits a secure insulation between the coil ends. A fully automatic production therefore becomes possible without any loss of quality.

Further details, characteristics and advantages of the invention are contained in the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 4:
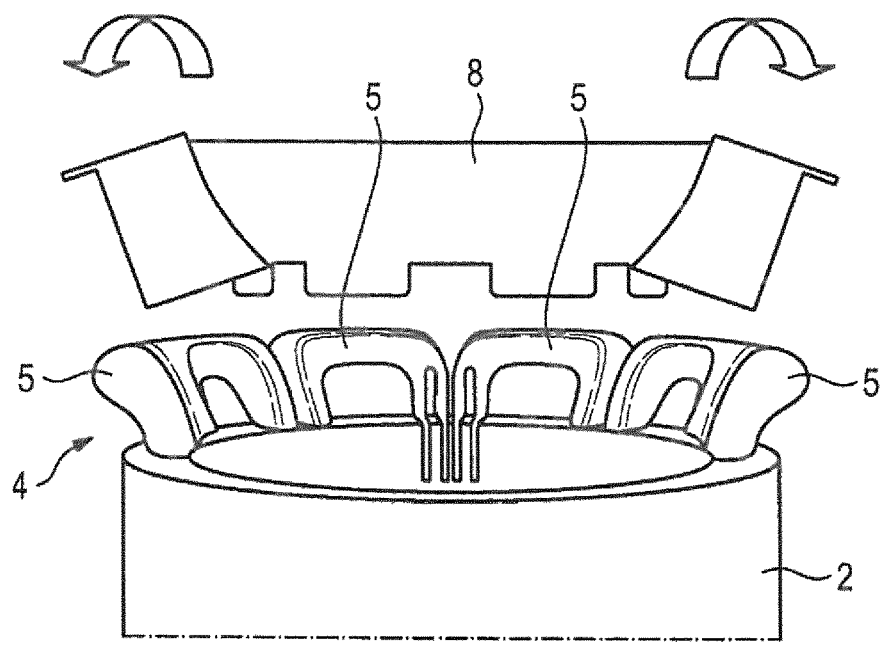
FIG. 4 is a view of a first variant of the production process of the stator of the invention according to the embodiment.
Figure 5:
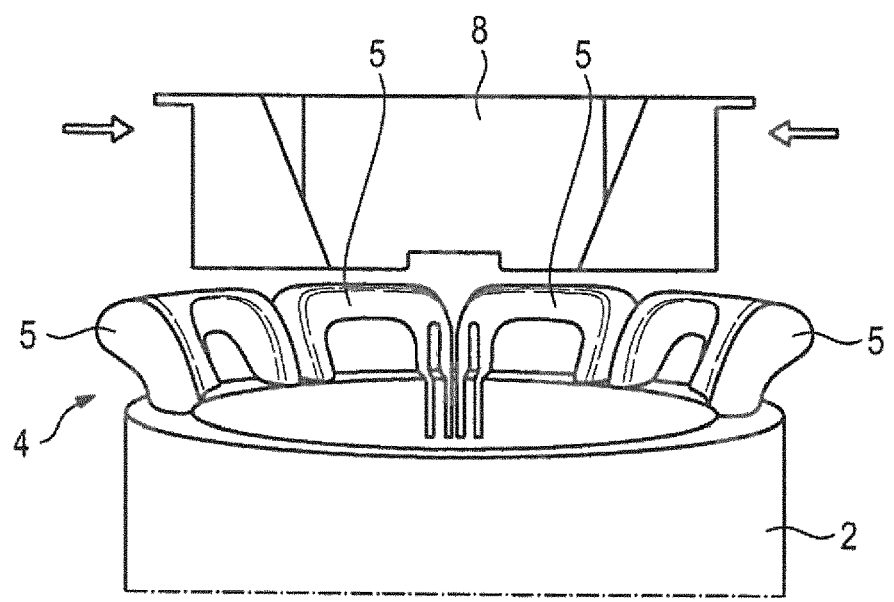
FIG. 5 is a view of a second variant of the production process of the stator of the invention according to the embodiment.

In the following, a stator 1 according to an embodiment will be described by means of FIGS. 1 to 3. FIGS. 4 and 5 illustrate two variants of the production process.

Figure 1:
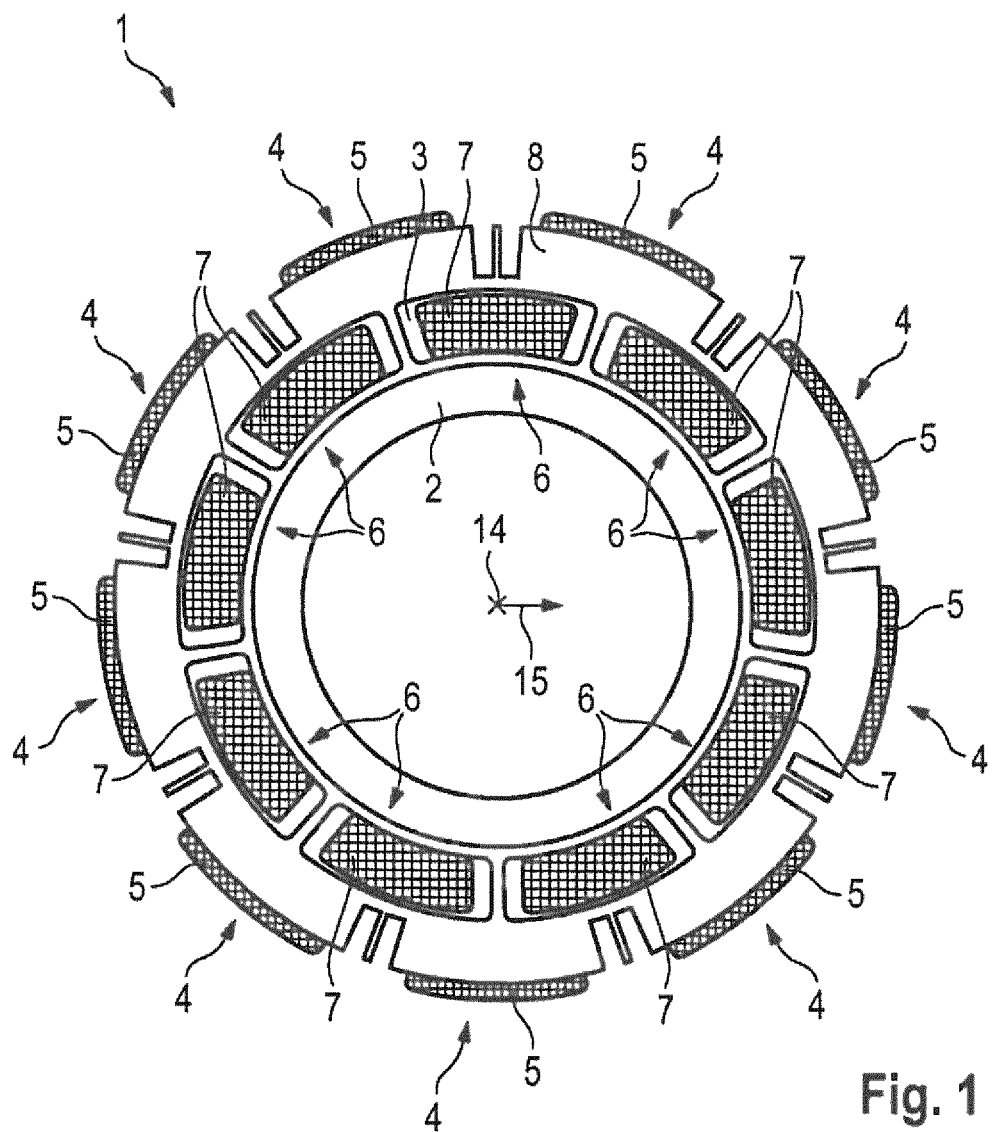
FIG. 1 is a top view of a stator of the invention according to an embodiment.
Figure 2:
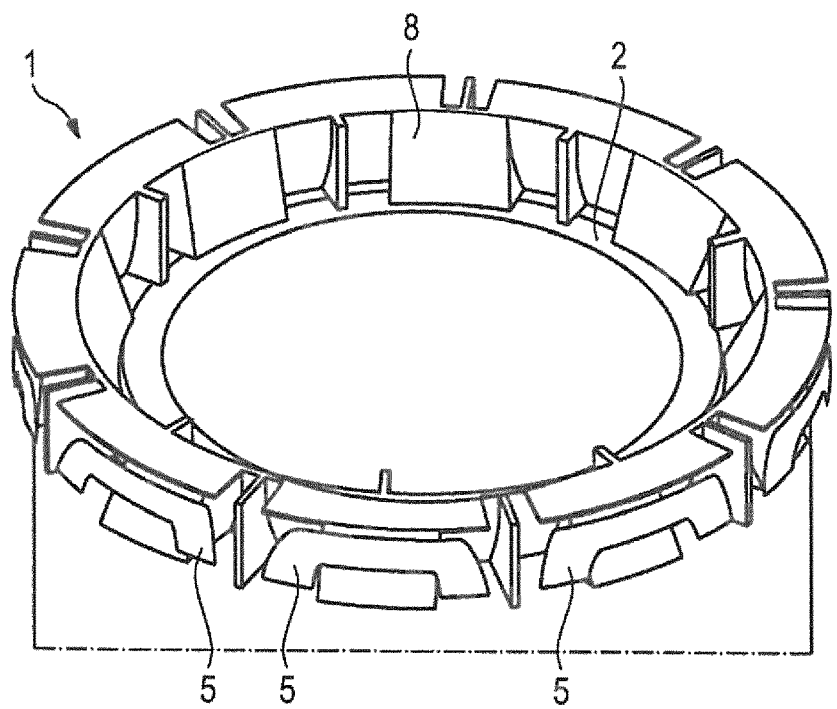
FIG. 2 is a view of a detail of the stator of the invention according to the embodiment.

According to FIGS. 1 and 2, the stator 1 has a cylindrical stator body 2 made of metal. An axial direction 14 is defined corresponding to the cylindrical design of the stator body 2. The axial direction 14 corresponds to the position of a rotor shaft. A radial direction 15 extends perpendicularly to the axial direction 14.

The stator body 2 has several stator slots 3. Several first coils 4 and several second coils 6 are inserted into the stator slots 3. In the illustrated embodiment, nine first coils 4 and nine second coils 6 respectively are pulled into the stator body 2.

Nine first coil ends 5 and nine second coil ends 7 are constructed on each face of the stator body 2. A molded body 8 made of injection-molded plastic is inserted onto the face of the stator body 2. The molded body 8 separates the individual coil ends 5, 7 from one another. FIGS. 1 and 2 only show one face of the stator body 2. Actually, the molded body 8 is preferably used on both faces. The representation of nine coil ends respectively is to have no limiting effect. The process according to the invention and the molded body according to the invention respectively can also be used for a different number of coil ends.

In the production process of the stator 1, the first coils 2 are pulled into the stator slots 3 first. This is followed by the placing of the molded body 8 and therefore the inserting of the first coil ends 5 into the molded body 8. Subsequently, the pulling-in of the second coils 6 and the inserting of the second coil ends 7 into the molded body 8 takes place. For this purpose, FIG. 2 illustrates an intermediate step, in which the first coils 4 are already pulled in and the molded body 8 has been mounted.

Figure 3:
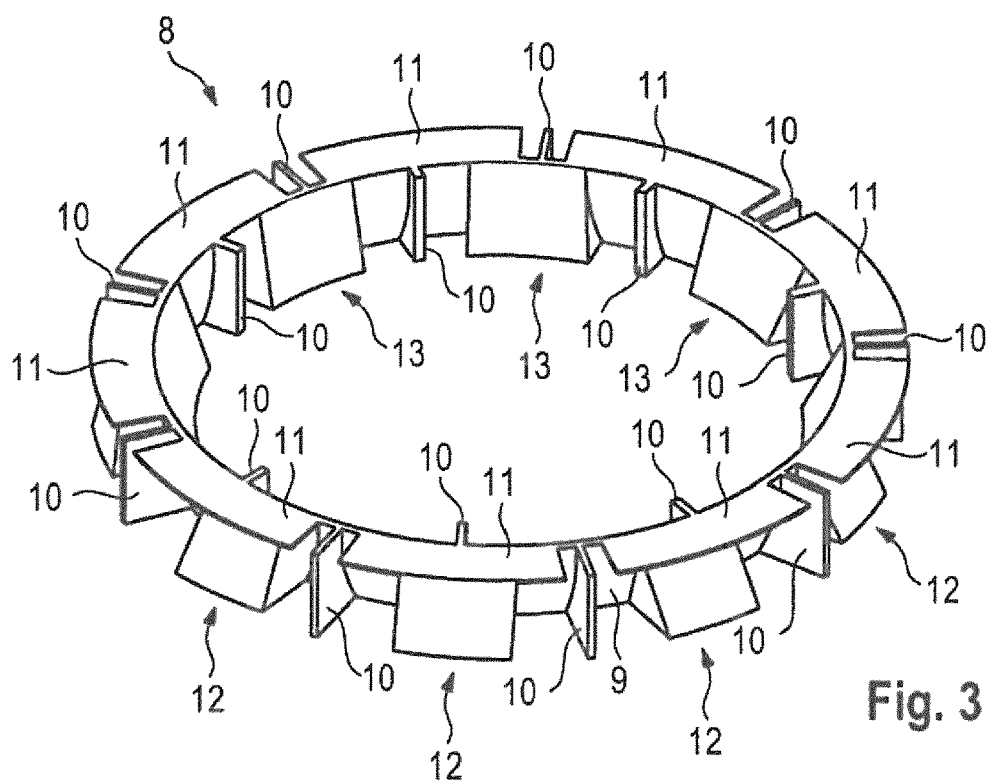
FIG. 3 is a view of a molded body of the stator of the invention according to the embodiment.

FIG. 3 is a detailed view of the molded body 8. In the illustrated embodiment, a one-piece molded body 8 is used for each face of the stator body 2. Correspondingly, the molded body 8 is further developed in a ring shape. The molded body 8 has a separating wall 9. This separating wall 9 extends along the entire circumference of the stator body 2. The separating wall 9 separates all first coil ends 5 from all second coil ends 7. The separating wall 9 extends in the axial direction 14 and is therefore arranged coaxially to the cylindrical shape of the stator body 2.

Several partition walls 10 extend from the separating wall 8. Partitioning walls 10 particularly stand perpendicularly on the separating wall 9. The partition walls 10 extend in the radial direction 15 on the interior side and on the exterior side of the separating wall 9.

On the exterior side of the separating wall 9, the partition walls 10 are each used for the separation between two adjacent first coil ends 5. On the interior side, the partition walls 10 are each used for the separation of two adjacent second coil ends 7.

Nine first receiving devices 12 are constructed on the exterior side of the separating wall. The first receiving devices 12 are each situated between two partition walls 10. The first coil ends 5 are inserted into these receiving devices 12. Nine second receiving devices 13 are situated on the interior side of the separating wall 9. The second receiving devices 13 are also each situated between two partition walls 10. The two coil ends 7 are inserted into the second receiving devices 13.

The first and second receiving devices 12, 13 are each constructed as projections, which extend in the radial direction 15 away from the separating wall 9.

For the covering and insulation of the coil ends 5, 7, covering walls 11 are constructed at the molded body 8. The covering walls 11 stand perpendicularly on the separating wall 9 and perpendicularly with respect to the partition walls 10. In particular, one covering wall 11 is provided for each first receiving device 12.

FIGS. 4 and 5 show two different variants for producing the stator 1. According to FIGS. 4 and 5, the molded body 8 consists of one piece, is ring-shaped and closed.

As a result of a certain flexibility of the molded body 8 in FIG. 4, the latter can be folded toward the inside, so that it becomes possible to place the molded body 8 from the inside onto the first coil ends 5. After the placing of the molded body 8, the molded body 8 is folded toward the outside, so that the first coil ends 5 are inserted into the first receiving devices 12.

The molded body 8 in FIG. 5 is deformed for the mounting, so that the diameter of the molded body 8 is reduced. Also in the variant according to FIG. 5, the molded body 8 is placed from the inside onto the first coil ends 5, so that the first coil ends 5 are inserted into the first receiving devices 12.

As indicated in FIGS. 4 and 5, each coil 4, 6 preferably consists of two individual coils connected in series. A separate stator slot 3 is provided for each individual coil. In the illustrated embodiment, there are therefore four stator slots 3 for each coil 4, 6.

LIST OF REFERENCE NUMBERS

1 Stator
2 Stator body
3 Stator slots
4 First coils
5 First coil ends
6 Second coils
7 Second coil ends
8 Molded body
9 Separating wall
10 Partition walls
11 Covering walls
12 First receiving devices
13 Second receiving devices
14 Axial direction
15 Radial direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a stator for an electric machine, comprising the steps of:
    providing a cylindrical stator body having a plurality of stator slots;
    inserting one or more first coils into the stator slots, each of the one or more first coils having first coil ends on at least one end face of the stator body; and
    subsequently inserting the first coil ends into a molded body, wherein the molded body having a plurality of partition walls extending radially outward from a circumferentially extending separating wall, the plurality of partition walls thereby separating and electrically insulating the first coil ends.

2. The method according to claim 1, wherein the one or more first coils comprises a plurality of first coils.

3. The method according to claim 2, further comprising pressing the coil ends together with the molded body.

4. The method according to claim 2,
    after inserting the first coil ends into the molded body, further comprising inserting one or more second coils into the stator slots, wherein, the one or more second coils have second coil ends;
    subsequently inserting the second coil ends into the molded body such that the separating wall separates the second coil ends from the first coil ends.

5. The method according to claim 4, wherein the second coils are arranged in the cylindrical stator body radially interior to the first coils.

6. The method according to claim 1,
    after inserting the first coil ends into the molded body, further comprising inserting one or more second coils into the stator slots, wherein, the one or more second coils have second coil ends;
    subsequently inserting the second coil ends into the molded body such that the separating wall separates the second coil ends from the first coil ends.

7. The method according to claim 6, wherein the second coils are arranged in the cylindrical stator body radially interior to the first coils.

8. The method according to claim 7, further comprising winding at least one of the one or more first coils and one or more of the second coils exterior to the stator body such that inserting the at least one of the one or more first coils and one or more second coils into the stator slots comprises pulling the at least one of the one or more first coils and one or more second coils into the stator slots.

9. The method according to claim 6, further comprising winding at least one of the one or more first coils and one or more second coils exterior to the stator body such that inserting the at least one of the one or more first coils and one or more second coils into the stator slots comprises pulling the at least one of the one or more first coils and one or more second coils into the stator slots.

10. The method according to claim 1, wherein the molded body comprises an injection-molded plastic.

* * * * *